United States Patent

Heilmann

[11] Patent Number: 6,131,961
[45] Date of Patent: Oct. 17, 2000

[54] QUICK CONNECTOR FOR THE CONNECTING OF HOSES AND PIPE CONDUITS

[76] Inventor: Christian Heilmann, Mozartstrasse 32, 72631 Aichtal, Germany

[21] Appl. No.: 09/176,754

[22] Filed: Oct. 22, 1998

[51] Int. Cl.[7] .................................................. F16L 37/18
[52] U.S. Cl. ............................ 285/316; 285/314; 285/315
[58] Field of Search ................................... 285/315, 316, 285/314

[56] References Cited

U.S. PATENT DOCUMENTS

| | | | |
|---|---|---|---|
| 2,092,116 | 9/1937 | Hansen | 285/314 |
| 2,708,589 | 5/1955 | Masek | 285/315 |
| 2,777,716 | 1/1957 | Gray | 285/316 |
| 3,336,944 | 8/1967 | Anderson et al. | |
| 3,643,695 | 2/1972 | Strah et al. | |
| 4,311,328 | 1/1982 | Truchet | 285/308 |
| 4,366,945 | 1/1983 | Blauenstein | 285/316 |
| 4,667,925 | 5/1987 | Gaita | |
| 5,116,086 | 5/1992 | Psajd | 285/315 |
| 5,290,009 | 3/1994 | Heilmann | 285/316 |
| 5,445,358 | 8/1995 | Anderson | 285/316 |
| 5,707,340 | 1/1998 | Hipp et al. | 285/314 |

FOREIGN PATENT DOCUMENTS

19 02 986   8/1970   Germany .

*Primary Examiner*—Lynne H. Browne
*Assistant Examiner*—Aaron Dunwoody

[57] ABSTRACT

The invention concerns a quick connector for the connection of hoses and pipe conduits for pressurized gases and liquids having a sleeve (1) which is connectable to a first conduit and a plug (2) for accepting a second conduit and having a locking device disposed on the sleeve comprising two locking pins (5) guided in slots (4) fashioned in the elastic material sleeve body (3) which snap into the plug groove (7) under the force of a pressure spring (6) during locking and, together with a bushing (8) surrounding the sleeve body (3) and borne thereon in an axially displaceable fashion, once more release the plug (2) through cooperation with both locking pins (5). An adapter (13), made from harder material, is disposed in the sleeve body and forms a stop and abutment for the locking pins (5).

9 Claims, 14 Drawing Sheets

QUICK CONNECTOR FOR THE CONNECTING OF HOSES AND PIPE CONDUITS

This application is related to European Patent Application Number 96106 347.6 published on Oct. 29, 1997 as publication Number EPO 803 676 A1, the complete disclosure of which is hereby incorporated by reference.

BACKGROUND OF THE INVENTION

Quick connectors of this type are known in the art from DE-C-1902986, U.S. Pat. No. 2,913,263 and U.S. Pat. No. 3,336,944. These quick connectors primarily serve to create a rapid connection between a sleeve (female part) and a plug (male part) by hand without the assistance of a tool which can be disconnected rapidly in a similar manner. The sleeve is normally stationary e.g. on a pressurized air supply, and the plug is normally secured to a pressurized air tool or mounted to an associated hose. Quick connectors are mass production articles and substantially replace the connection hose nozzle, hose and hose band clamp. Quick connectors are primarily used for pneumatic applications in particular in pressurized air technology and in hydraulic applications e.g. in chemical technology. Two cylindrical locking pins made from steel are used as locking elements for securing the plug to the sleeve. They are guided in slots introduced in the sleeve body at approximately 45° with respect to the middle axis. The locking pins project along their entire length beyond the outer diameter of the sleeve body and can be displaced diagonally with respect to the middle axis by a bushing, axially displaceable on the sleeve body. The pressurized spring surrounding the sleeve body pushes, via a pressure ring, the locking pins in such a manner that they move towards each other to a separation corresponding approximately to the diameter of the plug groove. This locking mechanism has the advantage of allowing simple one-hand operation. The plug can be inserted into the sleeve and locked therewith using one hand without having to pull back the bushing with the second hand. For disengagement, the bushing is moved by hand in opposition to the spring force. The locking pins are thereby displaced to their largest possible separation which exceeds the diameter of the plug enlargement. The plug is then released. Locking using locking pins is a particularly economical solution compared to other conventional locking mechanisms e.g. the ball lock e.g. of DE-OS-2558650. The ball lock necessitates displacing an additional spacer bushing below the ball for removing the plug in order to effect the desired single hand operation. In U.S. Pat. No. 4,198,080, the bushing is eliminated, but with the associated disadvantage that two hands must be used for locking.

DE-OS-1250698 discloses a quick connector having a ball lock, whereby different types of plugs fit into the sleeve. This configuration has disadvantages similar to those of DE-OS-2558650 of requiring an additional spacer bushing below the ball. Introduction of the radial ball bore in sleeve bodies made from metal is expensive and requires an additional processing step. If the sleeve body were made from plastic, high loading of the balls would press the balls into the ball bore. All of the above mentioned quick connectors with the exception of OS-1250698 have the disadvantage that only one type of plug fits into a sleeve body, since the sleeve body is adapted to the respective shape of the plug. Given a plurality of plug contours, an equally large number of sleeve bodies are thereby required. Conventional quick connectors having locking pins have the particular disadvantage of requiring a peripheral groove for the sealing ring on the inner bore of the sleeve body. This groove, due to the undercut, impairs removal after molding of a plastic sleeve body made using an injection molding tool.

Quick connectors with locking pins having some of the features claimed have also been used throughout the entire European market, e.g. those provided by the company FESTO of Germany. These quick connectors have hollow cylindrical sleeve bodies usually made from metal, rarely from plastic, and having diagonal slots for the locking pins. The diagonal slots in the metallic sleeve body are milled into the hollow cylinder using a disc milling cutter. A slot of this type penetrates through the sleeve body both in a direction longitudinal with respect to the middle axis of the locking pins as well as in a direction of an approximately 45° diagonal axis. The conventional plastic sleeve bodies also have two diagonal slots penetrating through the sleeve body which are machined, as is the metallic sleeve body, using a disc milling cutter. The associated penetration through the sleeve body of the diagonal slots up to the peripheral jacket is disadvantageous, since this leads to substantial weakening of this member. This is substantially more disadvantageous with plastic than with metal. These quick connectors also have the disadvantage that the sleeve body must be adapted in each case to the corresponding type of plug with respect to the associated length of the plug contour as well as with respect to its receiving diameter. A further disadvantage is that the groove for the sealing ring must be machined in the inner bore of the sleeve body. When metal is used, this recess is expensive to produce. When plastic is used, the piece cannot be removed after molding, as was mentioned above. An additional disadvantage of the conventional quick connectors having sleeve bodies made from plastic is that the locking pins, in particular for high pressure applications and under pulsing loads, are pressed into the diagonal slots of the sleeve body and cause permanent deformations leading to malfunctioning.

A quick connector having the features of the invention is also known in the art through DE-OS-2705319 wherein one sleeve (in this case a plug connection valve) is proposed for three differing plug contours (in this case insertion members). This arrangement has the advantage of the adaptability of the sleeve body to three different plugs. It has, however, the disadvantage of a complicated construction having a large number of individual parts and therefore a large size. A further disadvantage is that it is only possible for differing plug shapes to be accommodated in one type of sleeve to a highly limited degree. For example, plugs having a different diameter in the forward cylindrical portion for sealing in the sleeve body no longer fit into a common sleeve body (in this case referred to as the valve casing). A further disadvantage is that the undercut for the sealing ring must be machined into a sleeve body made from plastic and the locking pins are pressed into the diagonal slots under high pressure loads.

Past developments in various different countries have led to different conventional plug contours. The present invention concerns five different plug shapes. A plug shape designated here as type I has been particularly widespread in Germany, Austria and Eastern Europe and is clearly illustrated in FIG. 2 of EP-B-0536434. A plug contour referred to herein as type II, has become very widely used in Scandinavia. A type III plug contour has been primarily used for the coupling of fluid conduits. The type IV plug profile is conventional according to ISO 6150 and US-Military Standard C-4109D as well as AFNOR E 49-053 and is widely used in the USA and in France. A plug contour of type V is widely used in Switzerland and is clearly described in EP-B-0013393. These differing developments have the following disadvantages: a manufacturer of quick connectors of the above 5 types must normally modify nearly all individual components for each plug shape. In particular, the sleeve body must be adapted to the respective plug contour. Most plug contours, as is the case in the current invention, require 5 differing sleeve bodies having diameters and longitudinal dimensions adapted to the respective plug shapes. Sleeve bodies made from metal having e.g. a peripheral groove for the seal recess at the inner bore require additional milling of the diagonal slot and substantial lathe machining. The production costs of a metallic sleeve body are approximately 50% of the production costs of the entire quick connector. For this reason, injection molded plastic sleeve bodies are particularly advantageous. However, this requires the manufacturer of quick connectors of the kind with which the present invention is concerned, to use five differing injection molding tools.

In contrast thereto it is the purpose of the present invention to create a quick connector having the above advantageous features and with easy handling which facilitates only one single sleeve body for all five differing plugs without having associated disadvantages such as a narrowing of the flow cross section or increased spatial dimensioning. An additional purpose of the invention is to replace the conventional sleeve body made from metal and having milled diagonal slots with more economical sleeve bodies made from plastic without the locking pins being pressed into the plastic under high load. It is an additional purpose of the invention to eliminate the machined peripheral groove for the seal of the conventional quick connector at the inner bore of the sleeve body without having to change the seal ring bearing as e.g. done with the ball lock. An additional purpose of the invention is to integrate the holding function of the spanning ring of the conventional solution, which secures the bushing in an axial fashion, directly into the sleeve body.

SUMMARY OF THE INVENTION

This purpose is achieved in that the sleeve body made from plastic has an snapped-in hollow cylindrical adapter. This adapter, which is preferentially made from metal, has the advantage that it can be produced, with all its contours including the linear openings, on an automatic lathe. The openings for the locking pins and the nubs are not therefore produced in an expensive second processing step by milling. A quick connect according to the present invention therefore completely avoids milling work. In contrast thereto, the diagonal slots of the conventional metal bodies must be produced using a disc milling cutter.

The invention is described below with reference to the drawings.

DESCRIPTION OF THE PREFERRED EMBODIMENT

Figure 1:
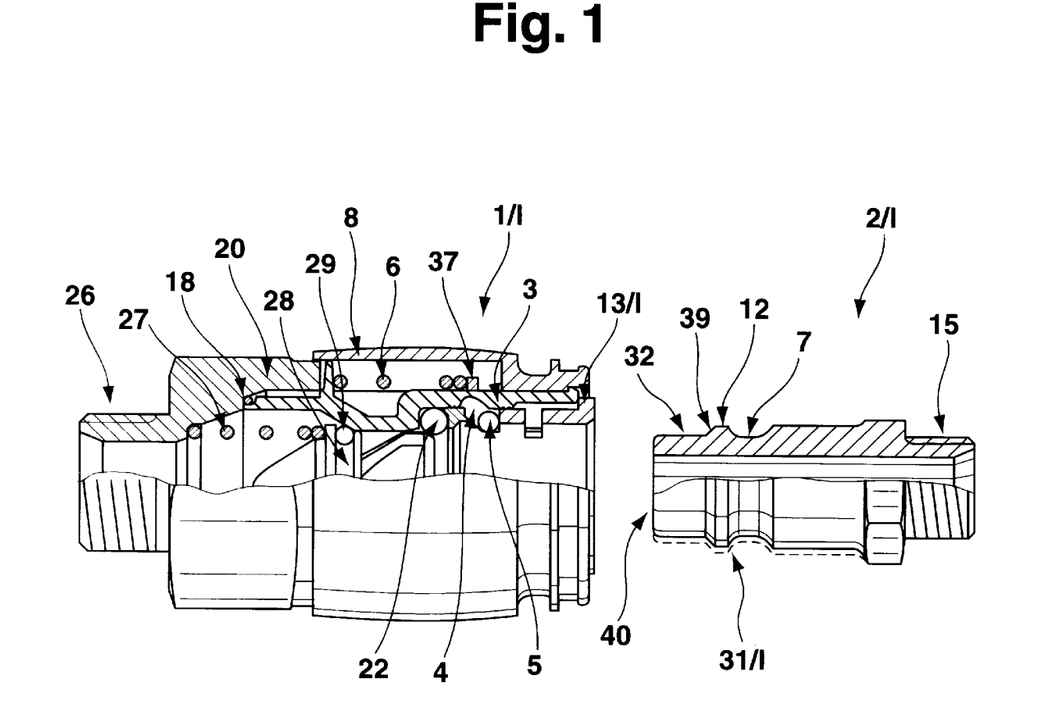
FIG. 1 shows a partial cut of a quick connector in accordance with the invention in the unlocked state with the associated plug type I.
Figure 2:
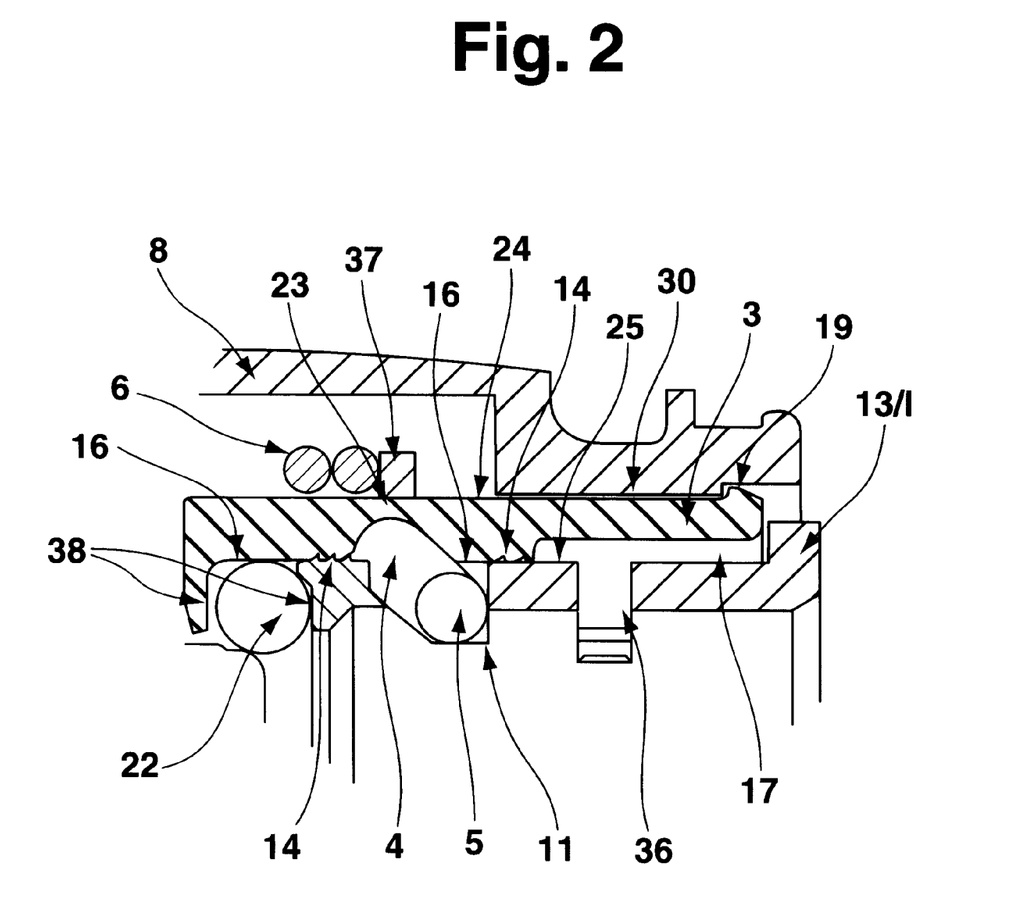
FIG. 2 shows a highly enlarged detailed view of FIG. 1.
Figure 3:
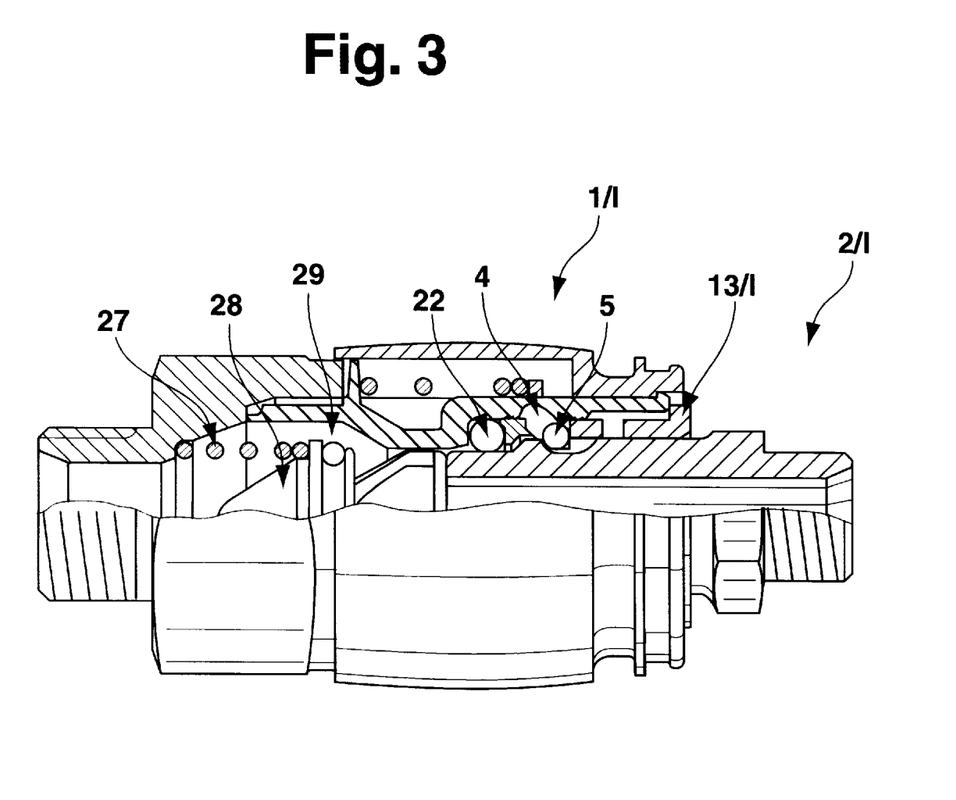
FIG. 3 shows a quick connector in accordance with the invention in a locked state having plug type I in a partial cut.
Figure 4:
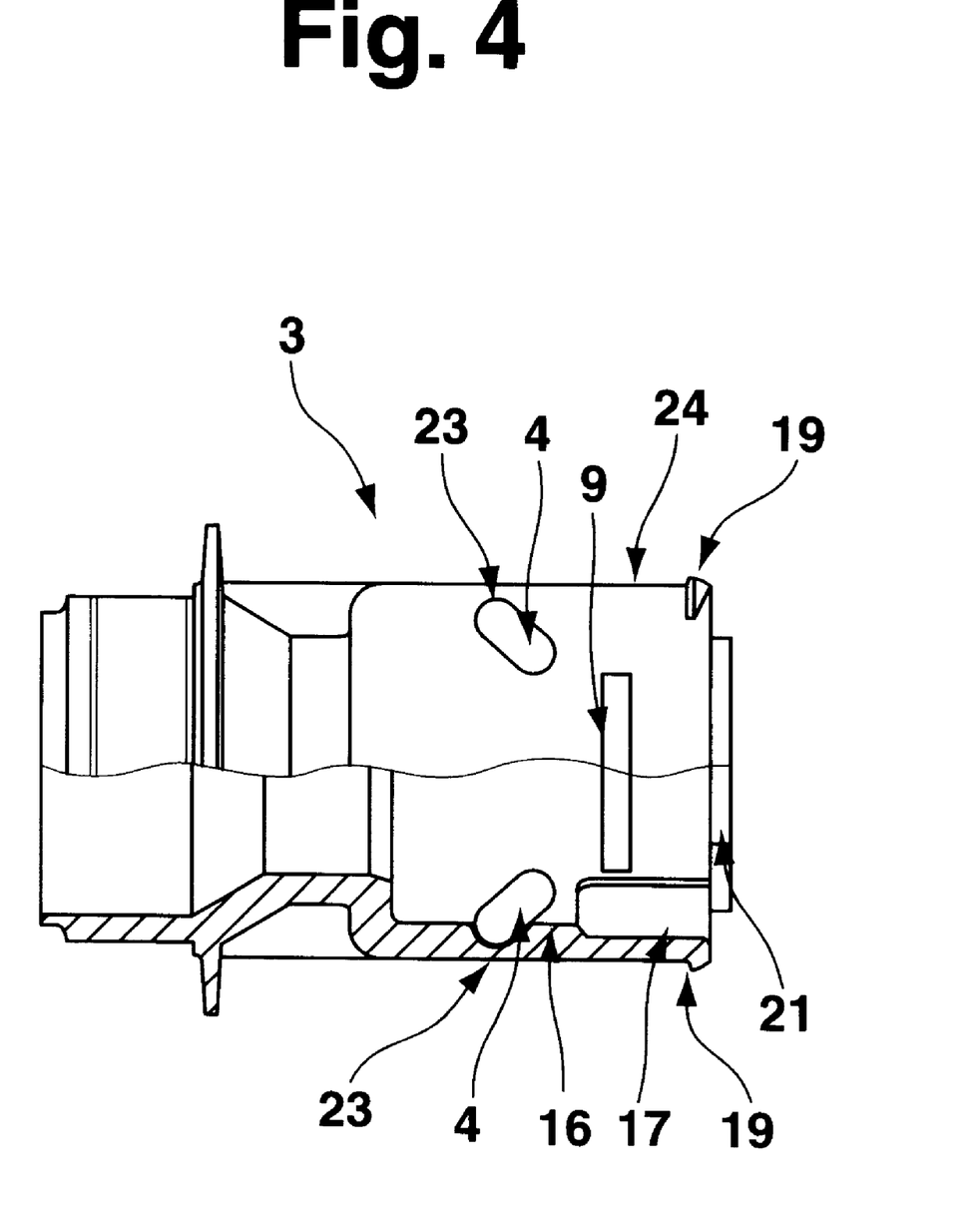
FIG. 4 shows a partial cut of the sleeve body.
Figure 5:
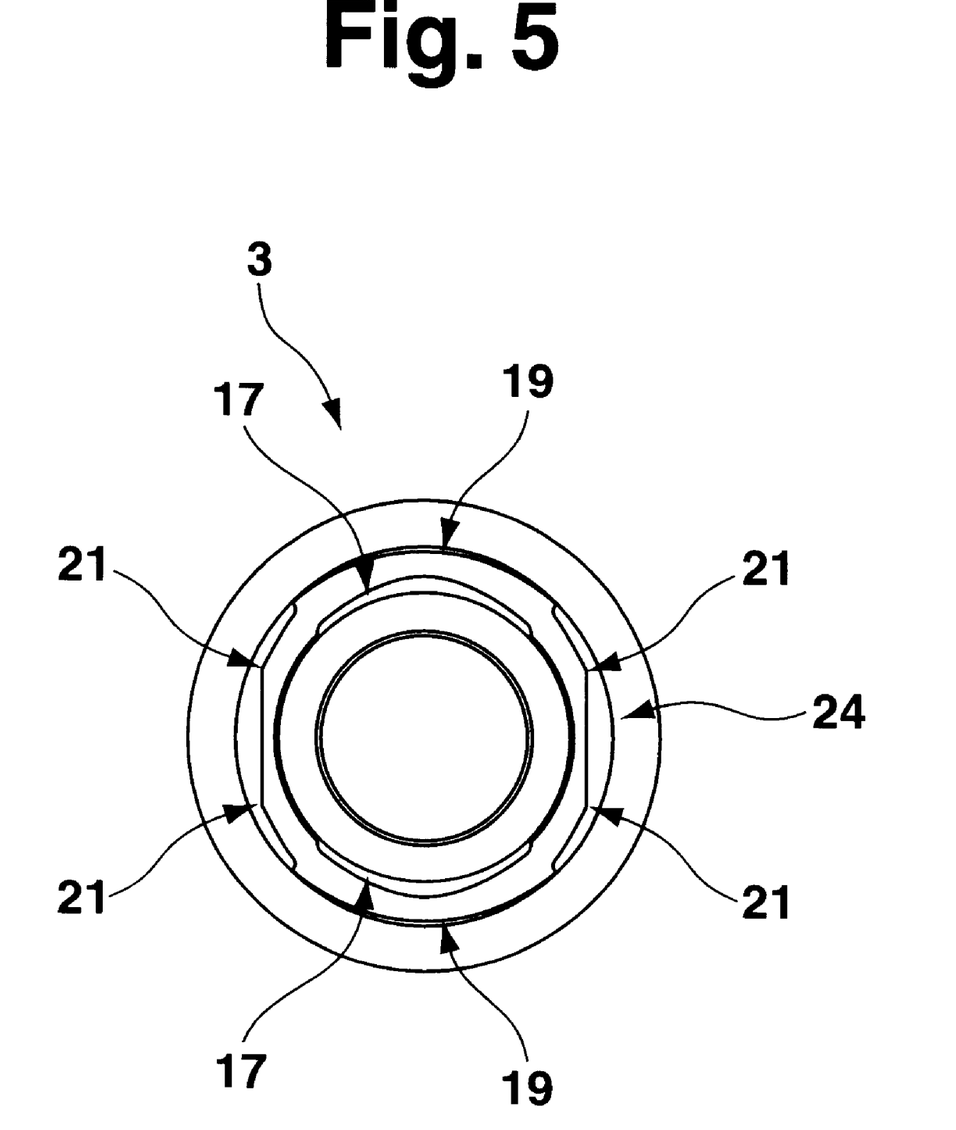
FIG. 5 shows a view of the sleeve body from the adapter input side.
Figure 6:
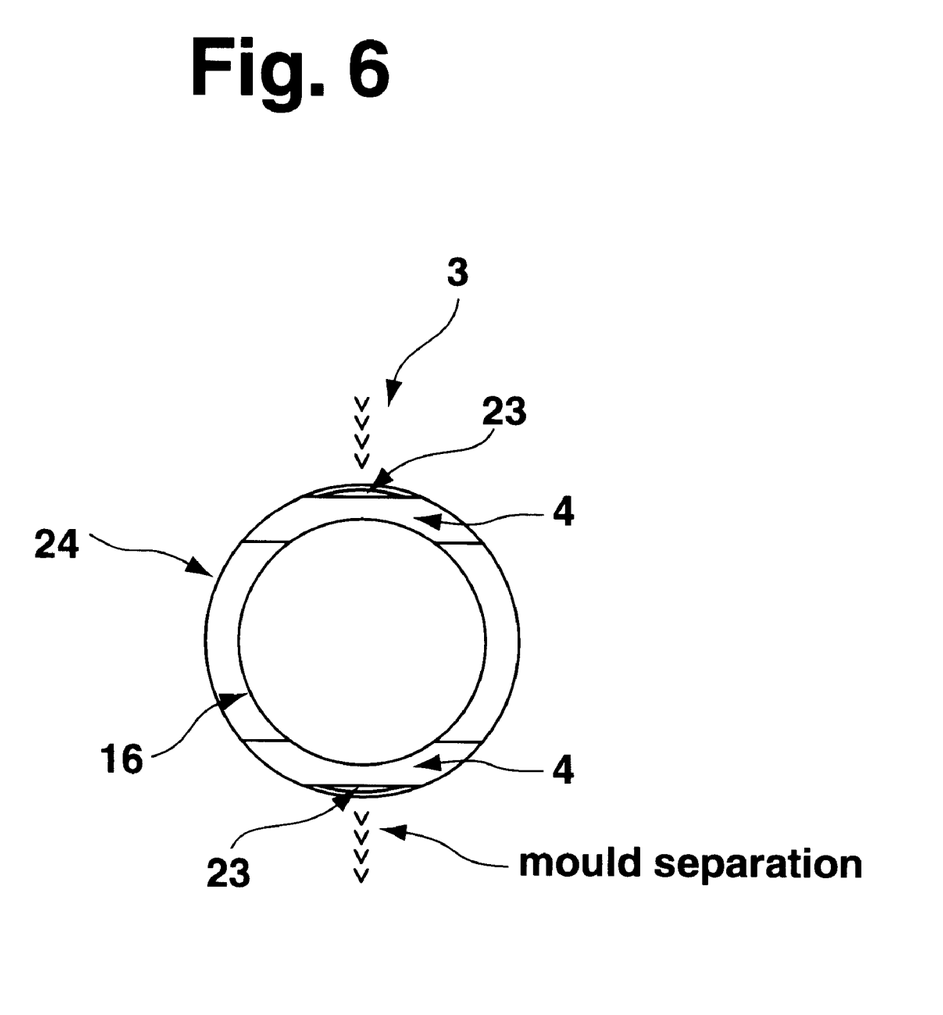
FIG. 6 shows a cross section through the sleeve body in the vicinity of the diagonal slot.
Figure 7:
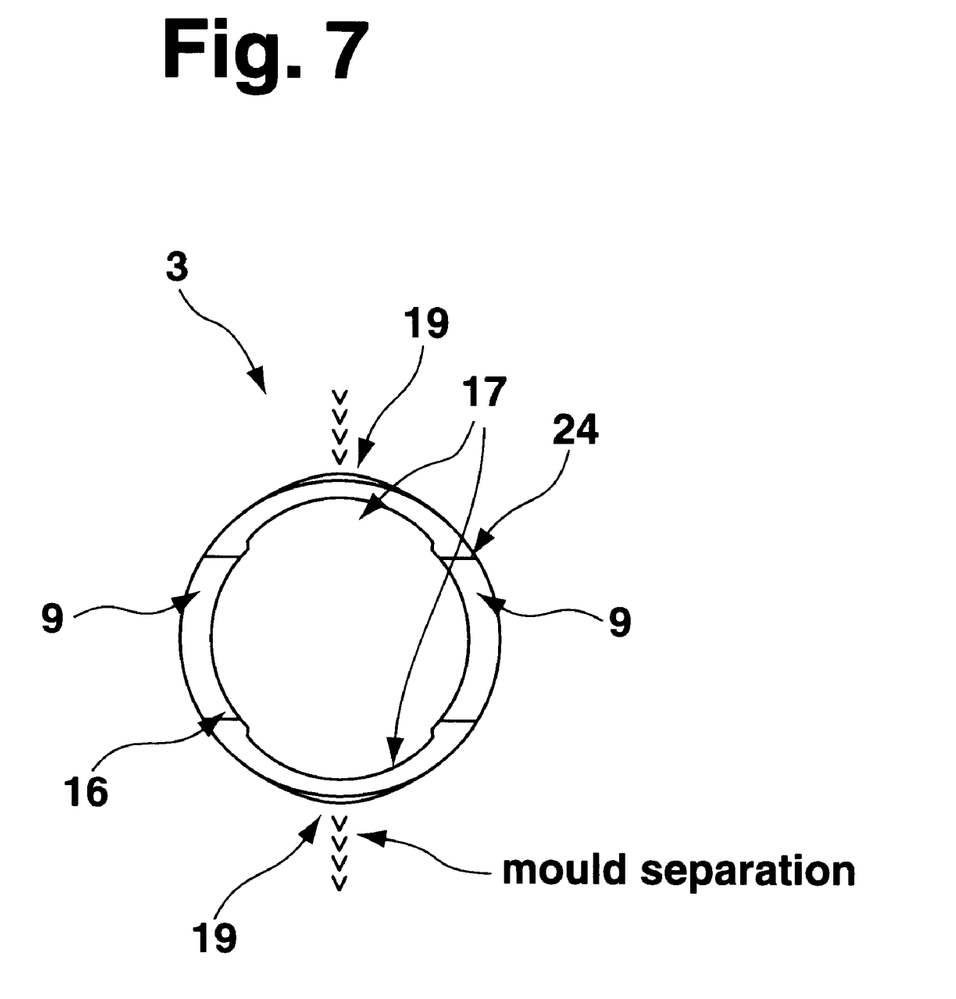
FIG. 7 shows a cross section through the sleeve body in the vicinity of the break-through for receiving the snap-in nubs.
Figure 8:
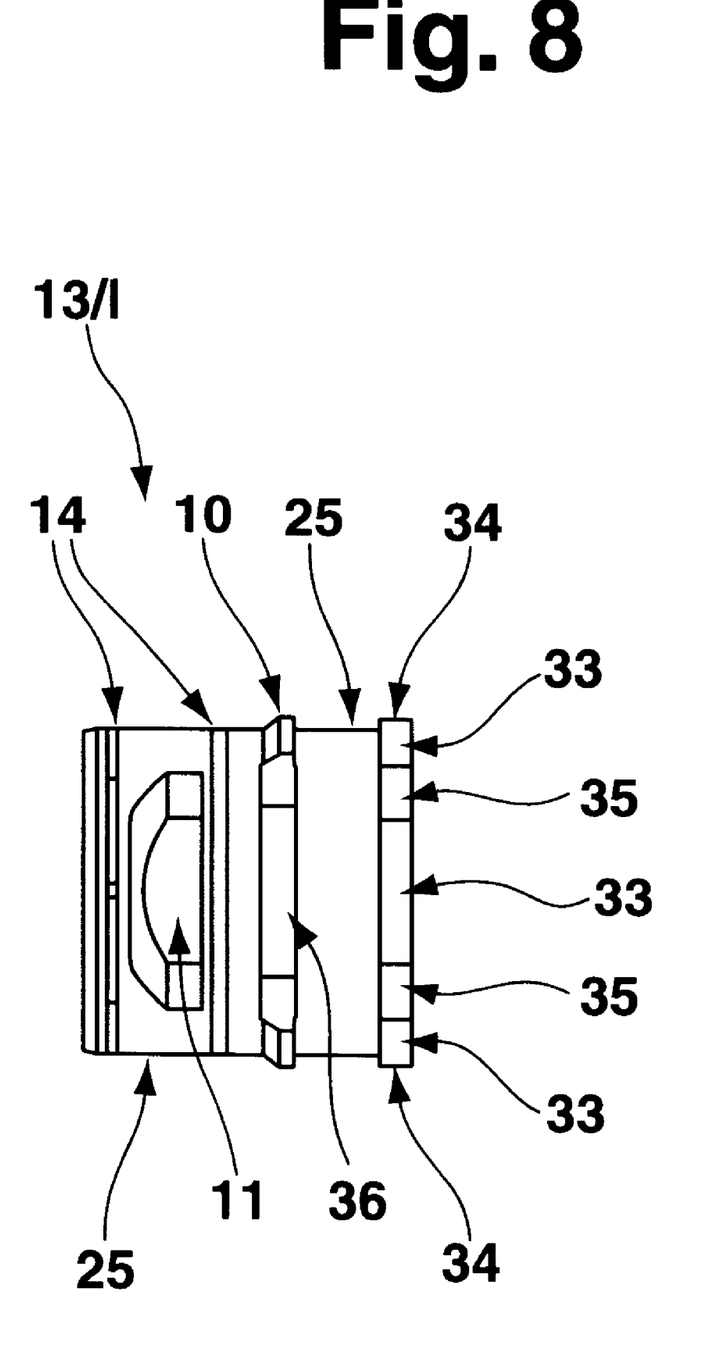
FIG. 8 shows a view of the adapter.
Figure 9:
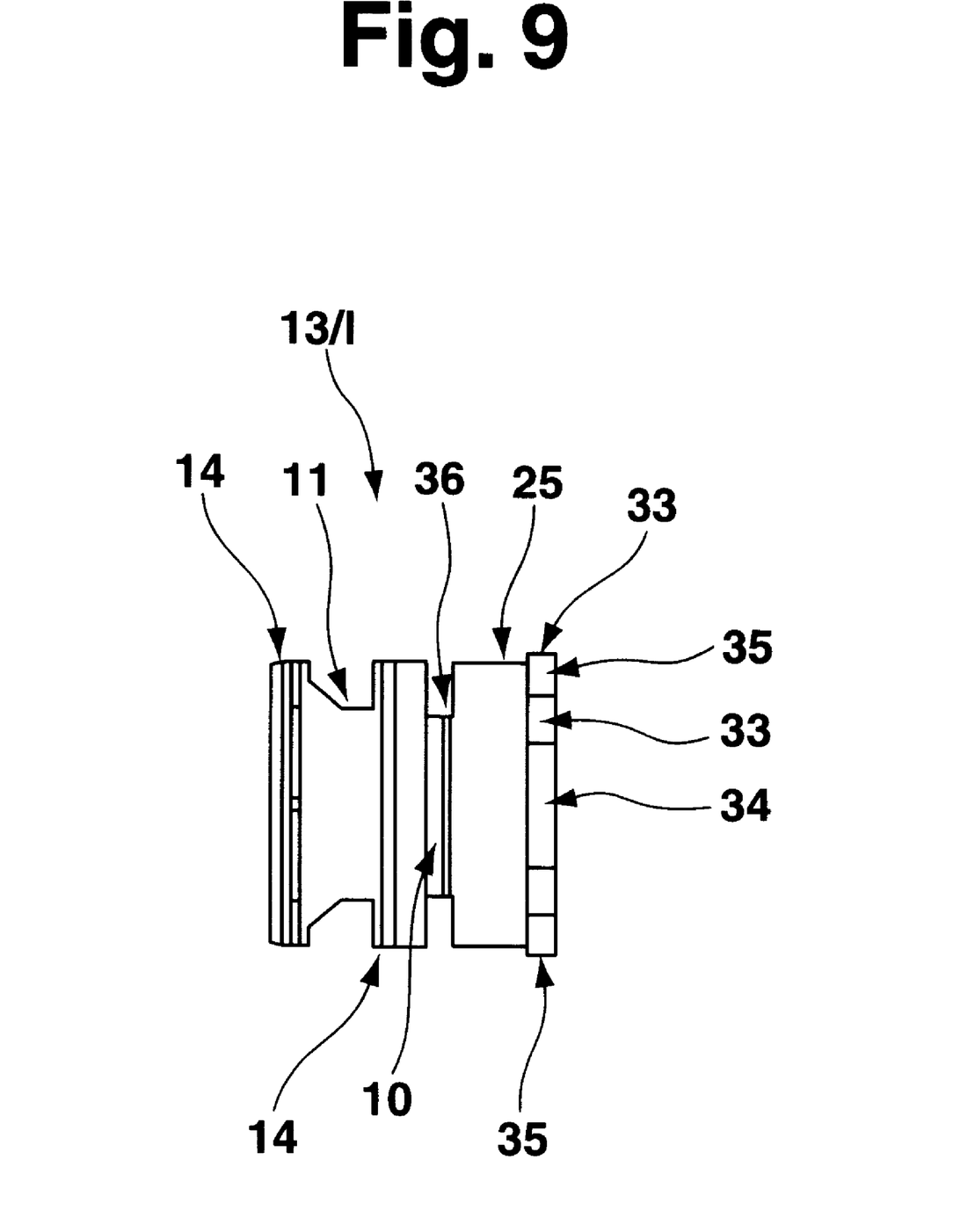
FIG. 9 shows the view of the adapter of FIG. 8, but rotated by 90° about its middle axis.
Figure 10:
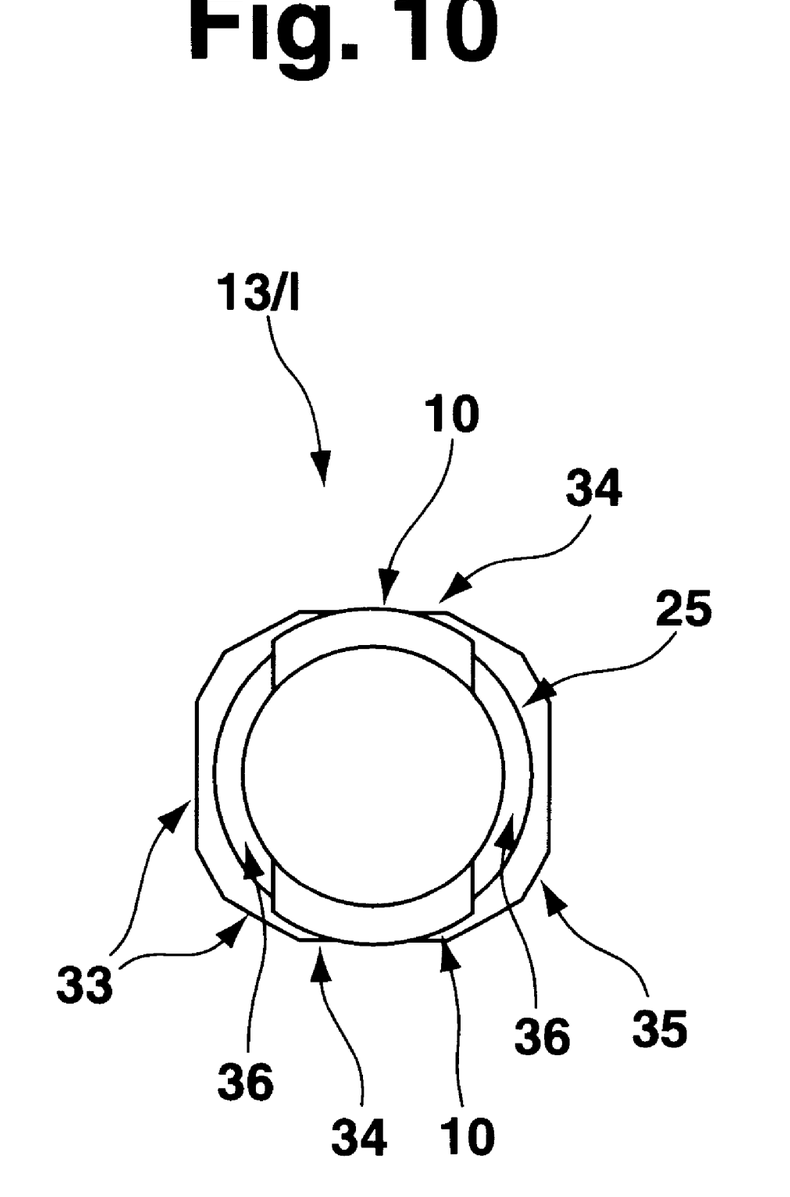
FIG. 10 shows a cross section of the adapter in the vicinity of the snap-in nubs.
Figure 11:
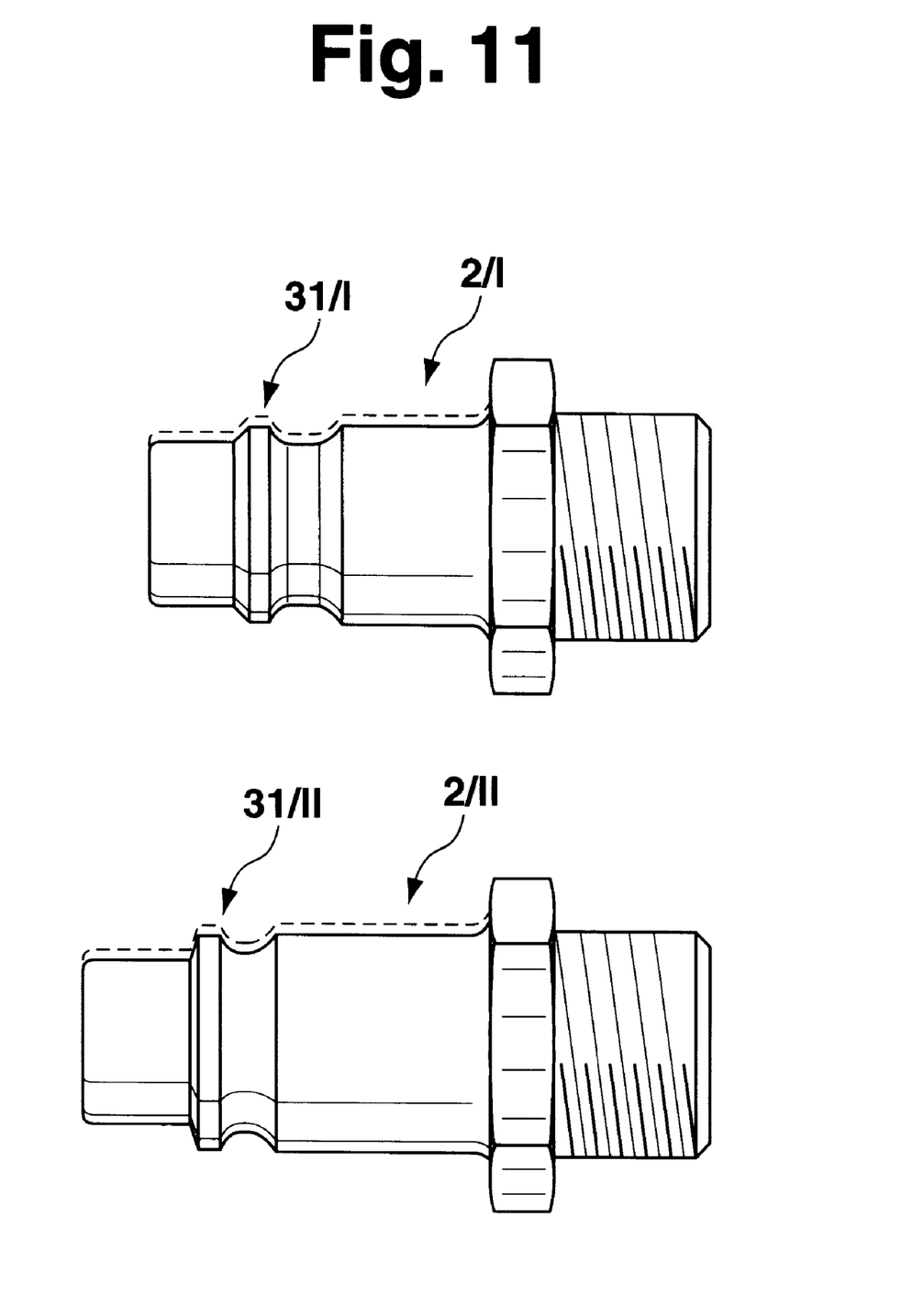
FIG. 11 shows two differing plugs having the two differing plug contours, types I, II, which fit into the sleeve body in accordance with the invention.
Figure 12:
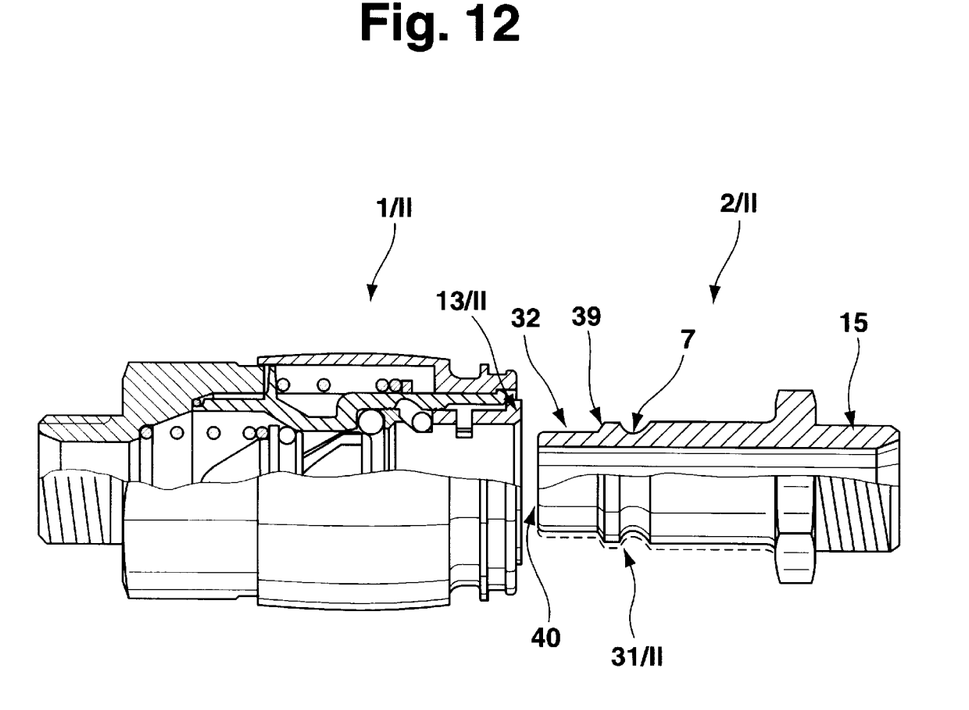
FIG. 12 shows a partial cut of a quick connector in accordance with the invention in the unlocked state with plug type II.
Figure 13:
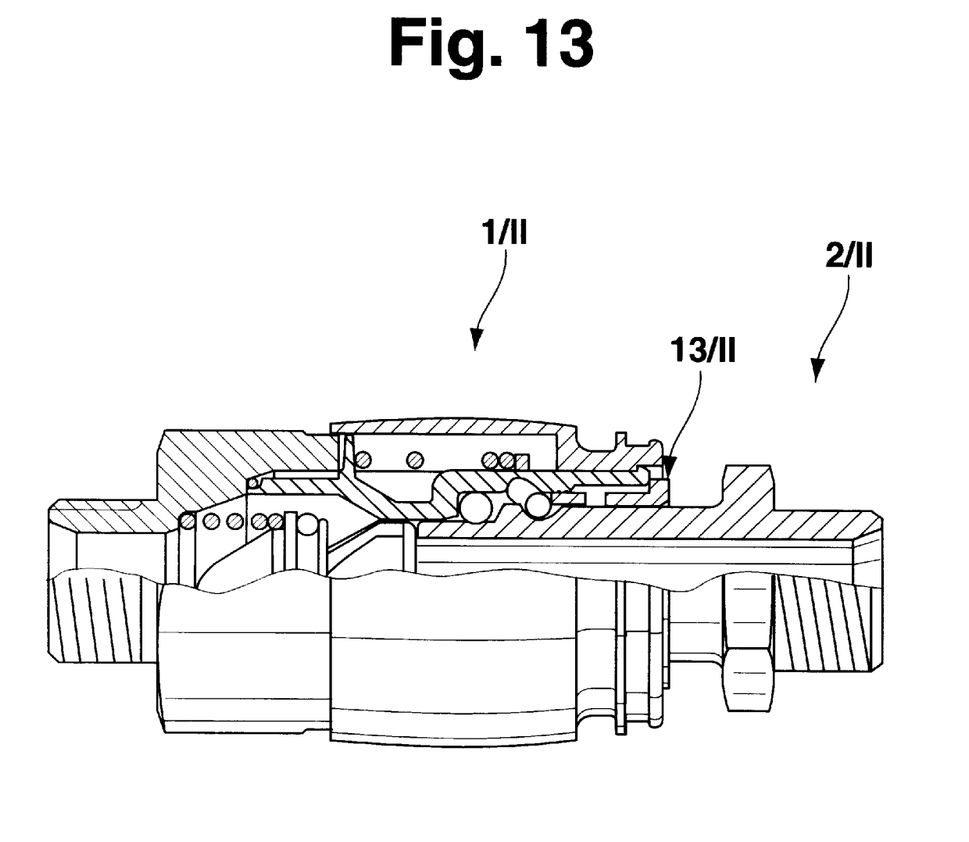
FIG. 13 shows a partial cut of a quick connector in the locked state in accordance with the invention having plug type II.

The drawings illustrate two embodiments of the invention. The quick connector shown serves for the coupling of two hoses or pipe conduits (not shown) and consists essentially of a sleeve 1/I, 1/2 and a plug 2/I, 2/II associated with the sleeve which can be inserted into the sleeve in a sealing fashion with the assistance of seal ring 22. For reasons of simplicity, this sleeve will be designated below using the reference symbol 1 and the plug using the reference symbol 2. The sleeve 1 is normally stationary, e.g. installed on a pipe conduit, whereas the plug 2 is normally disposed on a tube or on a tool (also not shown). The sleeve 1 has an extruded plastic substantially hollow cylindrical sleeve body 3 on the one end of which a connecting member 20 is screwed, sealed by a seal 18. Both the connecting member 20 as well as the plug 2 can have widely differing connectors 15 or 26 e.g. inner threads, outer threads or hose nozzles. The sleeve 1 has a bore hole 16 for receiving the adapter 13. The sleeve 1 also has a semi-circular indentation 17. The plug has a sealing diameter 32. The quick connectors are normally configured as quick locking couplings, i.e. the sleeve has a valve 28 including a sealing ring 29, which closes in the decoupled state and is opened when the plug 2 is inserted. This valve, loaded by a pressure spring 27, is disposed in the sleeve body proximate the connecting member 20. For reasons of simplicity, the designation quick connector is utilized in the subsequent description. In addition, a sealing ring 22 is disposed in the sleeve body proximate the adapter (13/I, 13/II) and is held between two shoulders 38. The sleeve body 3 is penetrated by two oppositely disposed diagonal slots 4 in such a fashion that the diagonal slots penetrate through the sleeve body in the mold removal direction, whereas a segment-like bridge 23 is fashioned spanning the diagonal slots 4 in the vicinity of the mold separation. The sleeve body 3 has an outer periphery 24 for receiving the busing 8. In addition to the two diagonal slots, two break-throughs 9 penetrate through the hollow cylinder. Neither these break-throughs 9 nor the diagonal slots 4 have an undercut and therefore can be easily removed from an injection molding tool. An adapter 13/I, 13/II is disposed on the input side of the plug in the sleeve body 3 whose structure is adapted to the respective shapes of the plugs 31/I, 31/II. For reasons of simplicity, this adapter is referred to in the subsequent description using only the designation 13 and the plug contour using the reference symbol 31. The adapters are fully manufactured on automatic lathes. The snap-in nubs 10 of the adapter are formed by machining the two oppositely lying openings 36 on an automatic lathe. The two oppositely lying openings 11 for receiving the locking pins 5 are made in a similar fashion. The adapter 13 is inserted axially into the sleeve body 3 so that its snap-in nubs 10 latch into the break-throughs 9. A bayonet connection could also alternatively be used, wherein the adapter 13 is first inserted axially into the sleeve body 3 and rotated such that the snap-in nubs 10 then latch into the break-throughs 9. After assembly of the adapter, the openings 11 are aligned with the diagonal slots 4 of the sleeve body. The locking pins 5 can thereby penetrate through both bodies. The openings 11 of the adapter and the diagonal slots 4 of the sleeve body thereby cooperate together with the locking pins 5 in such a fashion that the diagonal slots 4 provide a guide and the openings 11 the abutment for the tensile forces of the plug 2. To insure that it can only be inserted into the sleeve body 3 in its preferred position, the adapter 13 has a hexagonal contour 33 on its end extending out of the sleeve body (having width across flats corresponding to the raw material) at which the edges are machined to a dimension 35 lying between the width across flats 33 and the associated corner dimension. In addition, two edges are flattened to form the surfaces 34. The width across flats of the two surfaces 34 is less than the width across flats of the hexagonal surface 33. This hexagonal contour for the adapter 13 is accepted by corresponding hexagonally shaped depressions 21 in the sleeve body 3 so that the adapter is introduced into its preferred position. Such couplings having metallic adapters are normally intended for use in pressurized air applications at pressures of up to 25 bar. For reasons of mechanical stability, the entire tensile force of the plug can therefore not be transferred via the snap-in nubs 10. For this reason, additional supporting peripheral sharp protrusions 14 are introduced about the periphery 25 of the adapter. After insertion of the adapter 13 into the sleeve body 3, these protrusions penetrate into the plastic sleeve body and form an interlocking connection. After the adapter 13 has been pressed into the sleeve body in its preferred position, the locking device is assembled: i.e. the pressure spring 6, the pressure ring 37 and both locking pins 5 are installed. The pressure spring 6 urges the locking pins 5 towards the locking position given by the respective adapter 13. The last component is the bushing 8 with the internal bore 30 which is placed over the segmented raised sections 19 so that these segmented raised portions are pushed radially inward into the semi-circular shaped recesses 21 to complete assembly of the coupling. When the plug 2 is inserted into the sleeve 1, the diagonal shoulders 39 of the respective plug type of FIG. 11 push the locking pins 5 in an outward direction until the plug enlargement 12 has passed by both locking pins 5. At the same time, the front flat surface 40 of the plug pushes the valve 28 against the restoring spring force of the spring 27 and into the open position. The pressure spring 6 thereby pushes both locking pins into the plug groove 7 to lock the plug and simultaneously seal same with the assistance of the sealing ring 22. For unlocking, the bushing 8, which can be displaced on the sleeve body, is moved by hand towards the locking pins 5, against pressure ring 37 and spring 6. The locking pins 5 are thereby moved to a separation with respect to each other which is larger than the plug enlargement 12. The plug 2 is then once more freed.

This invention can also, in principle, be used in a two sided locking quick connection, i.e. for a coupling having a valve both in the sleeve and in the plug as well as in a coupling having a free opening i.e. a sleeve without valve.

Figure 14:
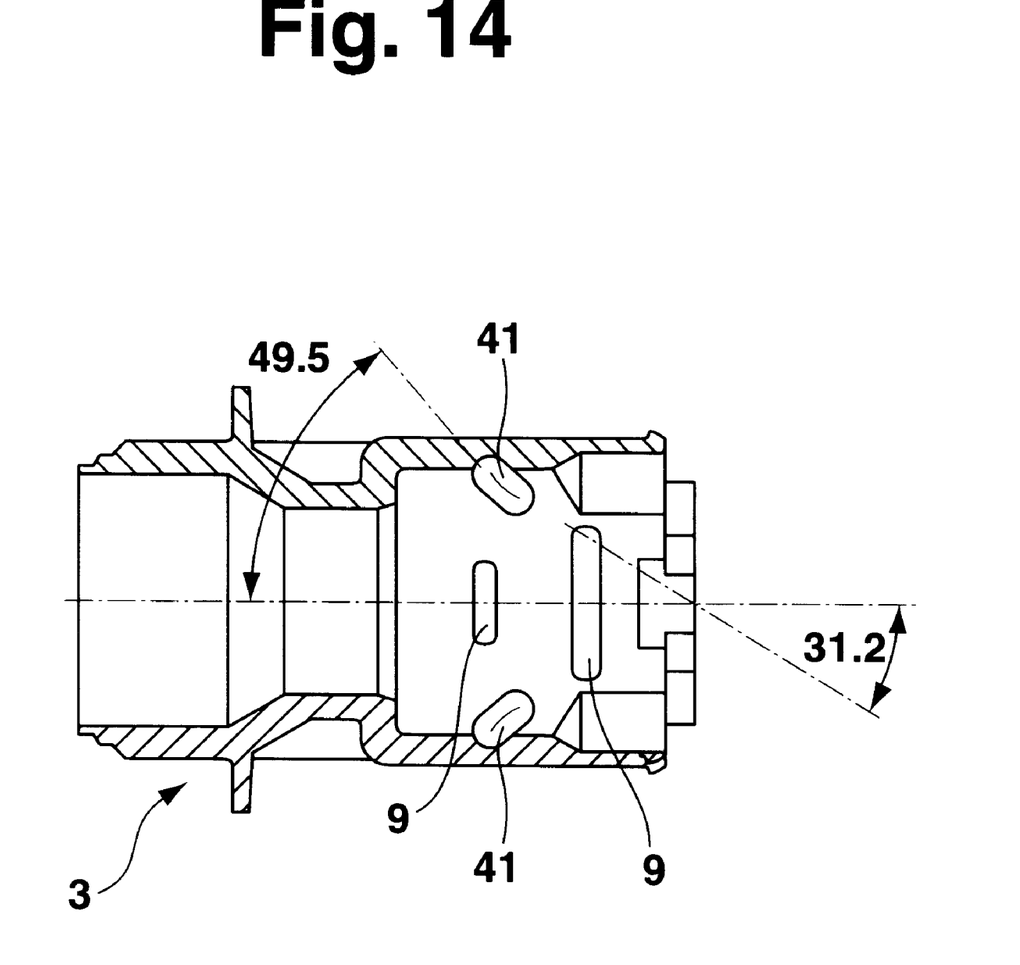
FIG. 14 shows a cut through a sleeve body having curved slots.

FIG. 14 shows a cross section through a sleeve body 3. In contrast to the sleeve bodies 3 shown in FIGS. 1 through 4, 12 and 13, the slots 41 for guiding the lock pins are curved. In the embodiment shown, a front portion of the slot 41 is oriented at an angle of 31.2° relative to a central axis of the sleeve body 3. A rear portion of the slot is outwardly curved and exhibits an angle of 49.5° relative to the central axis of the sleeve body 3. In particular, the curve can describe a circular arc. The end points of the slots 41 coincide with those of slots 4 of FIG. 4. The sleeve body having curved slots has the advantage, compared to the sleeve body 3 having straight slots, that a secure locking of the pins is guaranteed, both for small as well as for large plugs and associated adapters. In addition, the sleeve body 3 of FIG. 14 has, in contrast to the sleeve body of FIG. 4, two break-throughs 9 for accepting snap-in nubs of the adapter.

SUMMARY OF THE REFERENCE SYMBOLS USED IN THE DRAWINGS

Number Designation

1 generally a sleeve, a sleeve particularly adapted to the respective plug types 1/I, 1/II
2 generally a plug, particularly adapted to the corresponding sleeve type 2/I, 2/II
3 sleeve body
4 diagonal slots
5 lock pins
6 pressure spring below the bushing
7 plug groove
8 bushing
9 break-throughs in the sleeve body for receiving the snap-in nubs
10 adapter snap-in nubs
11 openings in the adapter for receiving the locking pins
12 plug enlargement
13 adapter in general, adapter specially suited for the respective plug type 13/I, 13/II
14 sharp protrusions on the adapter
15 connector for hose or tool on the plug
16 bore hole in the sleeve body for receiving the adapter
17 semi-circular indentation in the sleeve body
18 seal between the sleeve body and the connector
19 segmented raised sections for the snapping-on of the bushing
20 connecting member
21 hexagonal recesses in the sleeve body for precise positioning and receiving of the adapter
22 seal between the seal body and the plug
23 segmented bridges over the diagonal slots
24 outer periphery of the sleeve body for receiving the bushing
25 outer diameter of the adapter
26 sleeve connector for hose or pipes
27 spring on valve
28 valve in the sleeve
29 seal on valve
30 bore hole in the bushing
31 plug contour of the respective plug type in general and, in particular, for the respective plug types 31/I,II
32 seal diameter of the respective plug type
33 hexagonal surface of the adapter (width across flats of the raw material)
34 flattened edges of the adapter; smaller than the width across flats of the raw material
35 outside corner dimension of the width across flats of the adapter
36 opening in the adapter for forming the snap-in nubs
37 pressure ring between the outer pressure spring and the locking pins shoulder as abutment for the sealing ring in the valve body
39 front diagonal shoulder of the plug
40 front flat surface of the plug
41 curved slots

I claim:

1. A quick connector for connecting hoses and pipes for pressurized gases and liquids, the connector for connection to a first conduit at a first end thereof and for sealed acceptance of a plug, connected to a second conduit at a second end thereof, the quick connector comprising:
   a sleeve body, said sleeve body having a first and a second opening;
   an adapter disposed within said sleeve body, said adapter for accepting a respective contour of a plug, said adapter having a first and a second opening aligned with said sleeve body first and second opening;
   a locking device having a first locking member penetrating through said first sleeve body opening and said first adapter opening to lock the plug and a second locking member penetrating through said second sleeve body opening and said second adapter opening to lock the plug; and
   a bushing surrounding said sleeve body, said adapter and said locking device, said bushing in moveable engagement with said locking device to release the plug, wherein the sleeve body is made from at least one of an elastic material and a plastic and the adapter is made from at least one of a hard material and a metal, wherein said sleeve body has two oppositely positioned break-throughs, and wherein said adapter comprises snap-in knobs latching into said sleeve body break-throughs.

2. The quick connector of claim 1, wherein said first and second sleeve body openings and said first and second adapter openings are curved.

3. The quick connector of claim 1, wherein said adapter further comprises a seal member, retained axially, to seal between said sleeve body and said plug.

4. The quick connector of claim 1, wherein said adapter is first introduced in an axial direction into said sleeve body and then turned such that said snap-in nubs latch into said break-throughs in said sleeve body, whereby a bayonet connection is formed.

5. A quick connector for connecting hoses and pipes for pressurized gases and liquids, the connector for connection to a first conduit at a first end thereof and for sealed acceptance of a plug, connected to a second conduit, at a second end thereof, the quick connector comprising:
   a sleeve body, said sleeve body having a first and a second opening;
   an adapter disposed within said sleeve body, said adapter for accepting a respective contour of a plug, said adapter having a first and a second opening aligned with said sleeve body first and second openings;
   a locking device having a first locking member penetrating through said first sleeve body opening and said first adapter opening to lock the plug and a second locking member penetrating through said second sleeve body opening and said second adapter opening to lock the plug; and
   a bushing surrounding said sleeve body, said adapter and said locking device, said bushing in moveable engagement with said locking device to release the plug, wherein said first sleeve body opening is a first slot and said second sleeve body opening is a second slot, said first and second slots extending at angles relative to a central axis of the quick connector, and wherein said locking device comprises a first locking pin guided in said first slot and a second locking pin guided in said second slot, said locking device also comprising a spring cooperating with said first and said second locking pins to snap said first and said second locking pins into a groove in the plug, wherein said bushing is borne in an axially displaceable manner in opposition to a force of said spring and cooperating said first and said second locking pins, wherein said adapter comprises a second adapter opening aligned with said second slot, said first adapter opening passing and forming an abutment where said first locking pin and said second adapter opening passing and forming an abutment for said second locking pin, wherein said adapter comprises sharp peripheral protrusions about an outer diameter thereof at both axial sides of said first and said second openings which penetrate into a surrounding bore of said sleeve body.

6. A quick connector for connecting hoses and pipes for pressurized gases and liquids, the connector for connection to a first conduit at a first end thereof and for sealed acceptance of a plug, connected to a second conduit, at a second end thereof, the quick connector comprising:
   a sleeve body, said sleeve body having a first and a second opening;
   an adapter disposed within said sleeve body, said adapter for accepting a respective contour of a plug, said adapter having a first and a second opening aligned with said sleeve body first and second openings;
   a locking device having a first locking member penetrating through said first sleeve body opening and said first adapter opening to lock the plug and a second locking member penetrating through said second sleeve body opening and said second adapter opening to lock the plug; and
   a bushing surrounding said sleeve body, said adapter and said locking device, said bushing in moveable engagement with said locking device to release the plug, wherein said first sleeve body opening is a first slot and said second sleeve body opening is a second slot, said first and second slots extending at angles relative to a central axis of the quick connector, and wherein said locking device comprises a first locking pin guided in said first slot and a second locking pin guided in said second slot, said locking device also comprising a spring cooperating with said first and said second locking pins to snap said first and said second locking pins into a groove in the plug, wherein said bushing is borne in an axially displaceable manner in opposition to a force of said spring and cooperating said first and said second locking pins, wherein said adapter comprises a second adapter opening aligned with said second slot, said first adapter opening passing and forming an abutment where said first locking pin and said second adapter opening passing and forming an abutment for said second locking pin, wherein a bore in said sleeve body for acceptance of said adapter has two semi-circular indentations at approximately 90° with respect to said break-throughs proximate an entrance side of said adapter.

7. The quick connector of claim 6, wherein said sleeve body comprises raised sections protruding beyond an outer periphery thereof and disposed across from said indentations proximate an entrance side of said bushing, said raised sections being segment-shaped and abutting said bushing during assembly at a bushing bore surrounding said sleeve body.

8. A quick connector for connecting hoses and pipes for pressurized gases and liquids, the connector for connection to a first conduit at a first end thereof and for sealed acceptance of a plug, connected to a second conduit, at a second end thereof, the quick connector comprising:

a sleeve body, said sleeve body having a first and a second opening;

an adapter disposed within said sleeve body, said adapter for accepting a respective contour of a plug, said adapter having a first and a second opening aligned with said sleeve body first and second openings;

a locking device having a first locking member penetrating through said first sleeve body opening and said first adapter opening to lock the plug and a second locking member penetrating through said second sleeve body opening and said second adapter opening to lock the plug; and a bushing surrounding said sleeve body, said adapter and said locking device, said bushing in moveable engagement with said locking device to release the plug, wherein said first sleeve body opening is a first slot and said second sleeve body opening is a second slot, said first and second slots extending at angles relative to a central axis of the quick connector, and wherein said locking device comprises a first locking pin guided in said first slot and a second locking pin guided in said second slot, said locking device also comprising a spring cooperating with said first and said second locking pins to snap said first and said second locking pins into a groove in the plug, wherein said bushing is borne in an axially displaceable manner in opposition to a force of said spring and cooperating said first and said second locking pins, wherein said adapter comprises a second adapter opening aligned with said second slot, said first adapter opening passing and forming an abutment where said first locking pin and said second adapter opening passing and forming an abutment for said second locking pin, wherein said first and said second slots penetrate through said sleeve body in a direction for removal from a mold and have segment-shaped bridges spanning said first and said second slots proximate a mold separation location.

9. A quick connector for connecting hoses and pipes for pressurized gases and liquids, the connector for connection to a first conduit at a first end thereof and for sealed acceptance of a plug, connected to a second conduit, at a second end thereof, the quick connector comprising:

a sleeve body, said sleeve body having a first and a second opening;

an adapter disposed within said sleeve body, said adapter for accepting a respective contour of a plug, said adapter having a first and a second opening aligned with said sleeve body first and second openings;

a locking device having a first locking member penetrating through said first sleeve body opening and said first adapter opening to lock the plug and a second locking member penetrating through said second sleeve body opening and said second adapter opening to lock the plug; and a bushing surrounding said sleeve body, said adapter and said locking device, said bushing in moveable engagement with said locking device to release the plug, wherein said sleeve body has hexagonal-like recesses proximate an entrance side of said adapter for accepting a hexagonal profile of said adapter.

* * * * *